US005781356A

United States Patent [19]

Okada et al.

[11] Patent Number: 5,781,356
[45] Date of Patent: Jul. 14, 1998

[54] LEVELNESS ADJUSTING DEVICE OF AN ACTUATOR UNIT FOR A REARVIEW MIRROR

[75] Inventors: Kazunori Okada, Shizuokashi; Toshihiro Mochizuki, Fujiedashi; Kazunari Yamauchi, Fujieda; Masahiko Ito, Hamamatsu, all of Japan

[73] Assignee: Murakami Kaimeido Co., Ltd., Shizuoka-ken, Japan

[21] Appl. No.: 625,599

[22] Filed: Apr. 3, 1996

[30] Foreign Application Priority Data

Apr. 4, 1995 [JP] Japan ................................ 7-101642

[51] Int. Cl.⁶ .......................... G02B 7/182; G02B 5/08
[52] U.S. Cl. .................. 359/872; 359/871; 359/874; 359/841; 359/876
[58] Field of Search ....................... 359/871, 872, 359/874, 841, 877, 876

[56] References Cited

U.S. PATENT DOCUMENTS

| 5,110,195 | 5/1992 | Loney | 359/876 |
| 5,268,795 | 12/1993 | Usami | 359/877 |
| 5,313,336 | 5/1994 | Sakao et al. | 359/872 |
| 5,467,222 | 11/1995 | Oishi | 359/872 |
| 5,523,894 | 6/1996 | Koiwai | 359/872 |
| 5,610,772 | 3/1997 | Iizuka | 359/872 |

*Primary Examiner*—Paul M. Dzierzynski
*Assistant Examiner*—Mohammad Y. Sikder
*Attorney, Agent, or Firm*—Michael Striker

[57] ABSTRACT

A levelness adjusting device includes a positioning a unit mounted on a support surface for an actuator unit which is fixed on a frame, in which said positioning a unit comprises a base screw hole to play a support point, several adjusting screw holes which are located on a same circumference centering the base screw hole and are opened at positions adjusted to an inclination of the shaft for rotating a mirror body and several screws threaded into the screw hole so as to fix the actuator unit on the frame. The screw is penetrated from the actuator unit front portion to the frame via the screw hole which is formed on a periphery edge of the actuator unit. The screw is threaded into the base screw hole and the corresponding screw hole, and the actuator unit is positioned on the frame.

2 Claims, 6 Drawing Sheets

LEVELNESS ADJUSTING DEVICE OF AN ACTUATOR UNIT FOR A REARVIEW MIRROR

BACKGROUND OF THE INVENTION

The present invention relates to an outer mirror for automobiles having an actuator for adjusting a rearview mirror angle, more particularly, to a levelness adjusting device of the mirror actuator unit.

A mirror angle adjustable actuator and a mirror connected with said actuator are contained in a mirror body of the outer mirror for automobiles and said outer mirror is mounted on and projected widely from the automobile body side. For protecting the automobile from a contact with an obstacle when it is driven through a narrow space, or for a necessity of a narrow automobile width for parking it, the outer mirror needs to be rotated to a position where the driver can avoid the contact or a collision with the obstacle.

Figure 11:
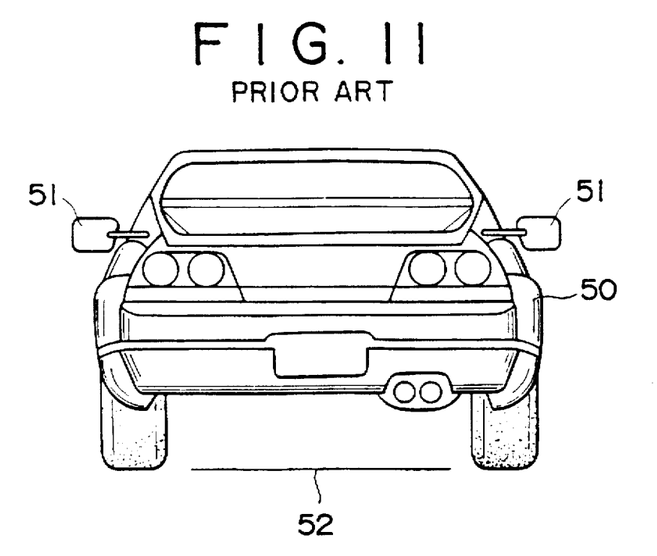
FIG. 11 is an outer view showing an example of an automobile which the foldable mirror is mounted on a door portion.

In conventional outer mirrors, a shaft is stood on a support portion, via said shaft, a mirror body is mounted on the automobile body so as to be rotated back and forth direction of the automobile body, for example, it has been popular to use a foldable mirror which mirror body can be held its folded state at the inside of the most out side line of the automobile body when it is parked, while it can be held on a normal erected state during running. FIG. 11 shows an outer view of the automobile 50 which foldable mirror 51 is mounted on a door portion.

It is known that the outer mirror has an important function to hold a rearward view of the automobile side body, especially it is required for changing a running lane during running, so that the driver always needs to adjust the mirror reflection angle to correspond with his eyes position in a driver's seat. Therefore many outer mirrors have been designed that the mirror reflection angle can be freely controlled from the driver's seat, and the actuator unit for adjusting the mirror reflection angle and the mirror connected therewith are contained in the mirror body. Several portions of the actuator unit are secured (fastened) by screws on a frame where the mirror body is integrally fixed on and when it is secured by screws, the position of an axis of abscissas X which plays the attachment base of the actuator unit is determined to be parallel to an automobile ground plane 52. Since the mirror reflection angle is adjusted by the actuator unit to a level of the driver's eyes which is parallel to the automobile ground plane, it is necessary to prevent an inclining actuation of the actuator unit by positioning a base axis of abscissas X of the actuator unit to be parallel with the ground plane 52.

Figure 12:
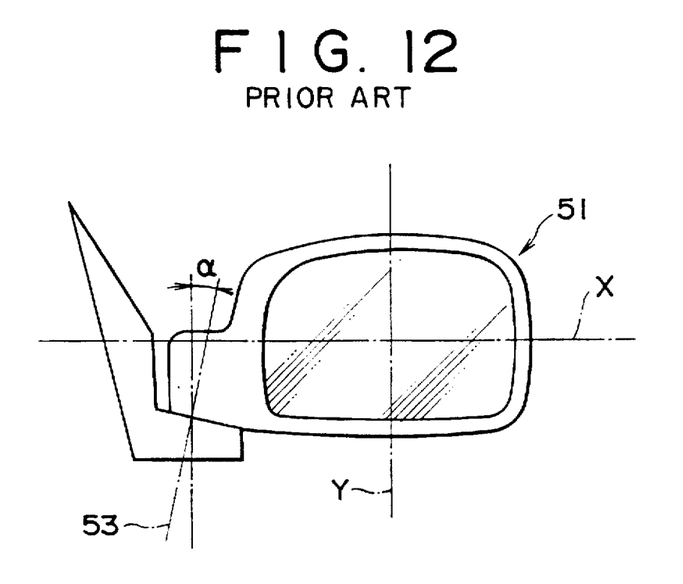
FIG. 12 is an explanation view of a condition that the shaft of the foldable mirror is inclined.

As described hereinbefore, in the foldable mirror, via the shaft stood on the supporting portion thereof, the mirror body is pivotably supported in backward and forward direction of the automobile body, while the position of the shaft is not always set at perpendicular position in respect of the automobile ground plane. For example, depending on kinds of automobiles, the mirror body formation has been modified in conformity with an outer appearance of an automobile body or as shown by FIG. 12, for a reason of an improved appearance of its folded state to fold it inside of the most outer side line of the automobile body, it has been designed that the shaft 53 position of the foldable mirror 51 is slightly inclined with an angle of α outwardly from the perpendicular state, so that the frame which the actuator unit is secured is supported with a corresponding inclination to the shaft and is mounted to rotate integrally with the mirror body which is secured on the frame.

However in the foldable mirror of which shaft is inclined with a certain angle outwardly from the perpendicular state as described hereinbefore, the actuator unit also needs to be positioned its base axis of abscissas is parallel with the automobile body ground plane, and the frame on which the actuator unit is secured must be preliminary set to correspond with the inclination of said shaft. This refers to the actuator unit also, so that the frame and the actuator unit provided in the mirror body can not be shared for each of conditions of the shaft being perpendicular or of being tilted. Therefore in the conventional foldable mirror, the frame or the actuator unit must be prepared separately depending on a condition of the shaft being perpendicular or of being inclined.

SUMMARY OF THE INVENTION

Considering the problems described hereinbefore, it is an object of the present invention to provide the outer mirror for the automobile enabling of sharing the frame and the actuator unit and a reduction of assemblies cost or of assemblies management steps can be achieved.

It is an object of the present invention to provide a foldable mirror having a frame rotatably supported on the shaft and an actuator unit for adjusting a horizontal level to correspond with an inclination of the shaft.

To achieve the object described above, in accordance with the preferred embodiment of the present invention, a levelness adjusting device of an actuator unit for a foldable mirror has a positioning means which is mounted on a support surface for the actuator unit to be fixed on a frame and the positioning means comprises a base screw hole to play a support point, several adjusting screw holes located on a same circumference centering of the base screw hole and opened at positions being adjusted to an inclination of a shaft for rotating a mirror body and several screws threaded into each screw hole so as to fix the actuator unit on the frame.

From the actuator unit front side toward the frame, the screw is penetrated through the screw hole formed on a periphery edge portion of the actuator unit. The screw is threaded into the base screw hole and the adjusting screw hole, thereby the positioning of the actuator unit on the frame is determined.

In accordance with one of preferable embodiments of the present invention, in the foldable mirror, a shaft is stood on a base for erecting and foldably rotating a mirror body and a frame where the mirror body is fixed is rotatably supported on the shaft. The support surface for an actuator unit is formed in a perpendicular direction of a front portion of the frame. The actuator unit is secured on the support surface via a positioning means for holding the actuator unit. A mirror element is tiltably mounted on left and right or on fore and aft of the actuator unit front side via a mirror holder.

The positioning means comprises a base boss protrudingly provided on the support surface, a base screw hole provided on an end surface of the base boss, an adjusting boss protrudingly provided upwardly from the base boss, a first and a second adjusting screw holes provided on an end surface of the adjusting boss and several joint screws threaded from the screw hole formed on the periphery edge portion of the actuator unit through the base screw hole and the adjusting screw hole.

The positioning means comprises a base boss protrudingly provided on the support surface, a base screw hole provided on an end surface of the base boss, a first and a second adjusting bosses protrudingly provided upwardly and oblique upwardly from the base boss, a first and a second adjusting screw holes respectively provided on each end surface of adjusting bosses and several joint screws threaded from the screw hole formed on the periphery edge portion of the actuator unit through the base screw hole and the adjusting screw hole.

The adjusting screw hole is opened on a same circumference centering of the base screw hole and is adjusted with an inclination of the shaft. In accordance with the present invention, for any conditions of the shaft of the foldable mirror being perpendicular or of the shaft being inclined, it is not necessary to prepare independent frames separately to correspond with each inclination of the shaft as required for the conventional foldable mirror, and the frame and the actuator unit can be shared and a reduction of assemblies cost for the outer mirror and a reduction of assemblies management steps can be achieved.

DESCRIPTION OF THE PREFERRED EMBODIMENTS

The one of preferable embodiments of the present invention will be described in accordance with the accompanying drawings.

Figure 1:
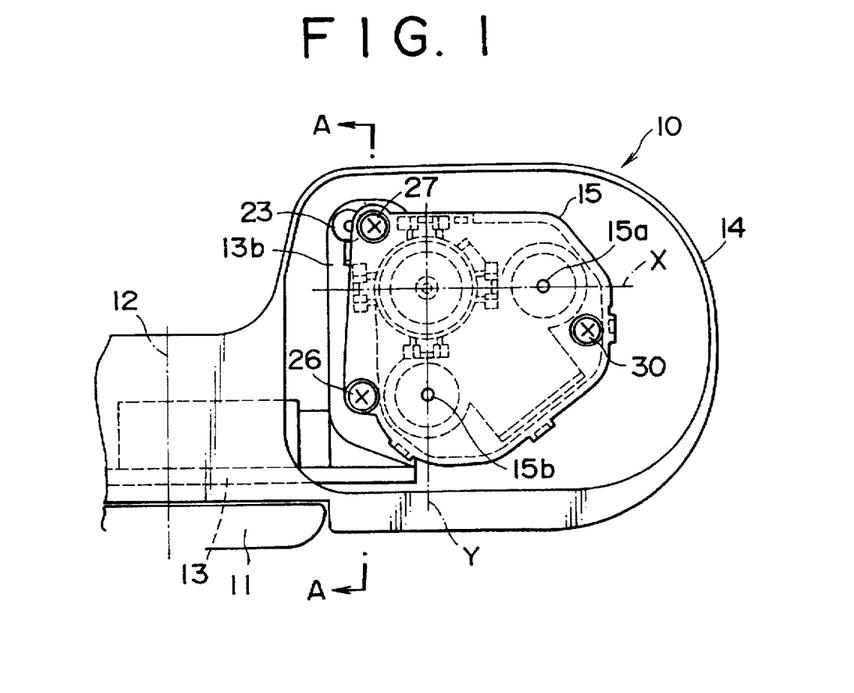
FIG. 1 is a skeletal elevational view of main parts of a foldable outer rearview mirror having a horizontal line adjusting device according to the preferred embodiment of the present invention and of an example of a shaft for rotating a mirror body being vertical.
Figure 2:
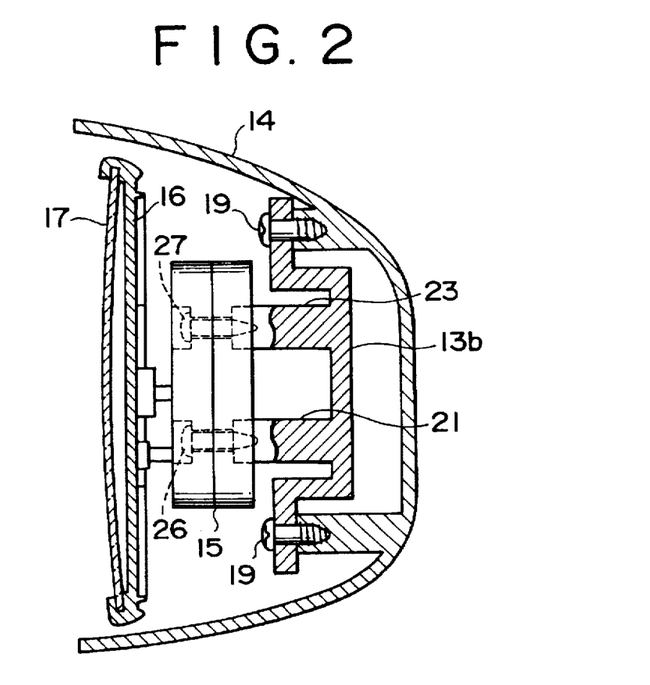
FIG. 2 is a cross section view of the outer mirror of FIG. 1 taken along the line A—A in FIG. 1 and a mirror glass and a mirror holder for supporting the glass are illustrated.
Figure 3:
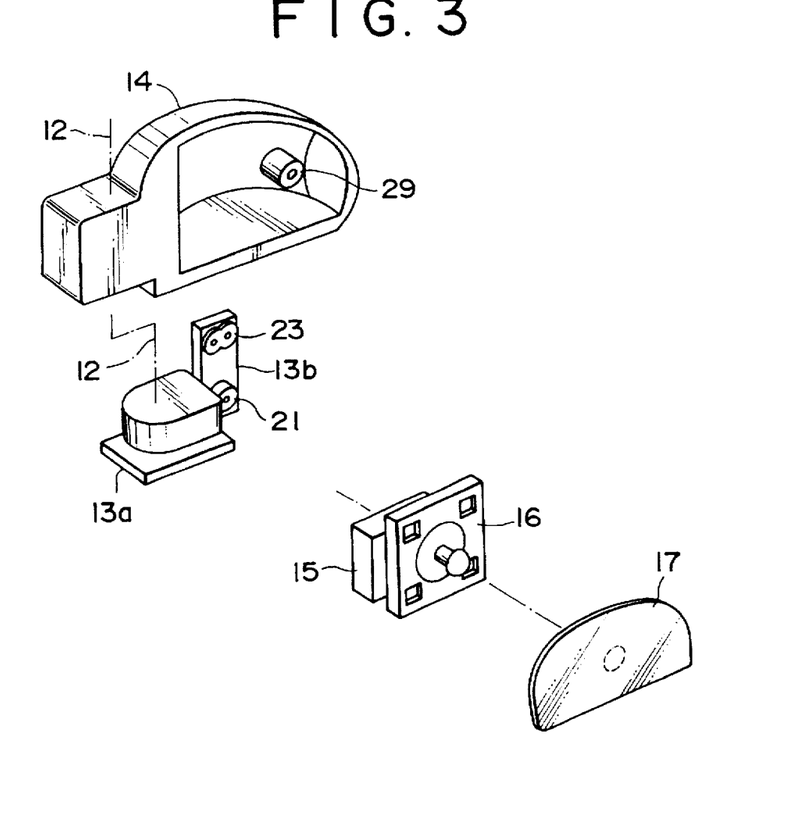
FIG. 3 is an exploded view of the outer mirror of FIG. 2.

In FIG. 1 and FIG. 2 which are skeletal elevational views of a foldable mirror assembly. The mirror assembly 10 has a base 11 secured on an automobile body, a shaft 12 stood on the base 11, a frame 13 pivotably supported on the shaft 12, a mirror body or a mirror housing 14 fixed on the frame 13, an actuator unit 15 secured on a front portion of the frame 13, a mirror holder 16 tiltably supported on the front portion of the actuator unit 15 and a mirror element 17 held on the front surface of the holder 16.

Figure 4:
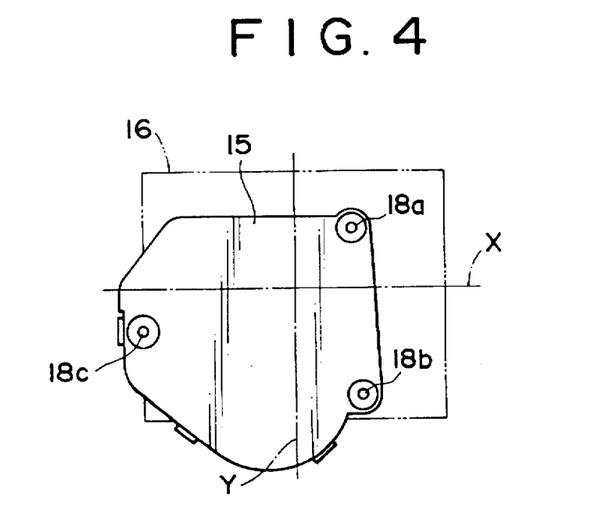
FIG. 4 is a rear elevation view of an actuator unit for adjusting a mirror reflection angle.

The actuator unit 15 is provided to adjust a reflection angle of the mirror element 17 and a motor and a gear mechanism (not shown) connected to the motor are contained in the actuator unit 15. Rods 15a, 15b are provided on the front portion of the actuator unit 15 and are located on axis lines X and Y orthogonally passing through a center of the mirror. The rods 15a, 15b move to backward and forward directions of the mirror element, and thereby the mirror element is adjusted to tiltably move vertically and horizontally (see FIG. 2). Screw holes 18a to 18c are formed at three portions on a periphery edge of the actuator unit 15 to be screwed on the frame 13 (see FIG. 4).

Figure 5:
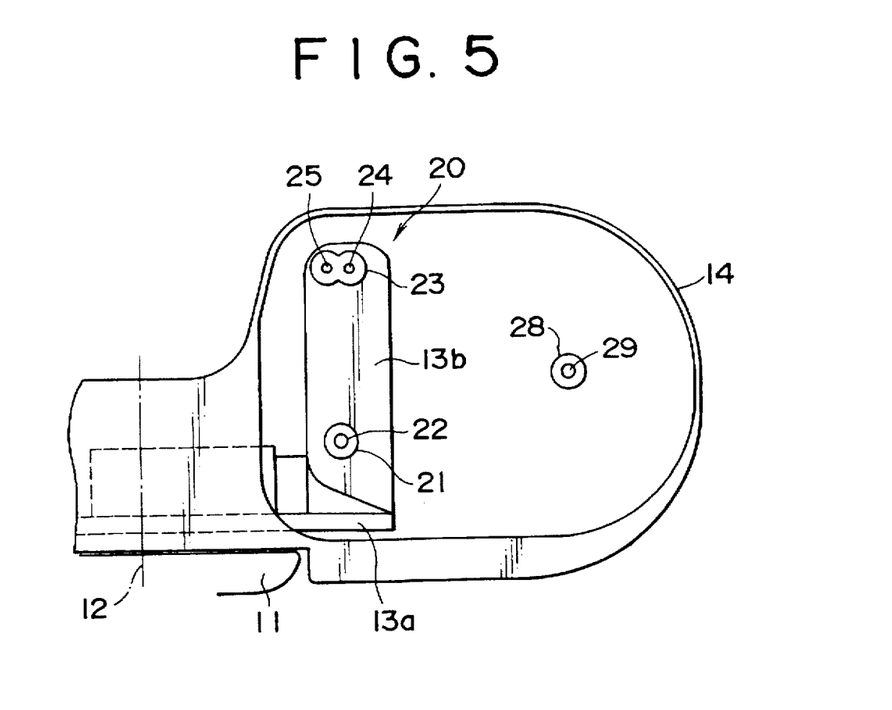
FIG. 5 is an elevation view of main parts of a frame portion in the mirror body , which the actuator unit is eliminated from the example shown by FIG. 1.

The frame 13 which is pivotably supported on the shaft 12 is secured on an inner wall of the mirror body 14 by screws 19, 19. As shown by FIG. 5, the frame 13 is composed of a root portion 13a which is pivotably supported around the shaft 12 and a column-shape support surface 13b vertically stood from the root portion. A positioning means 20 is mounted on the support surface 13b so as to support the actuator unit 15 at a determined position.

The positioning means 20 is composed of a base (main) boss 21 protrudingly mounted on the support surface 13b, a screw hole 22 provided on the base boss 21, an adjusting boss 23 upwardly projected from the base boss 21, two screw holes 24, 25 provided on the boss 23 and screws 26, 27 penetrated through these screw holes from a front surface of the actuator unit 15. This screw hole corresponds to any one of said screw holes which are formed on the actuator unit 15.

As shown by FIG. 5, adjacent to the root portion 13a the base boss 21 is so formed integrally with the support surface 13b that a certain length thereof is protruded from the support surface 13b. A screw hole 22 is provided on a circular end surface of the base boss.

The adjusting boss 23 is integrally formed with the support surface 13b toward the same direction and with the same length of the base boss 21, and a first and a second screw holes 24, 25 are formed on a round end surface having a neck. The first screw hole 24 is used for a condition of the shaft 12 being perpendicular and the second hole 25 is used for the inclined shaft. These screw holes 24, 25 are provided with certain spaces at the position of a same circumference centering the screw hole 22 provided on the base boss to correspond with an inclination of the shaft (see both FIG. 5 and FIG. 6).

Numeral 28 as illustrated by FIG. 5 indicates a boss protrudingly mounted on an inner wall of the mirror body 14 to attach the actuator unit 15 and a screw hole 29 is formed on a center of the circular shape end surface thereof. The screw 29 corresponds to one of three screw holes formed on the periphery edge of the actuator unit 15.

In the device as described hereinbefore, in FIG. 1, the position of the shaft 12 for rotating the mirror body is perpendicularly located from the automobile body ground plane and a condition of the frame pivotably supported on the shaft 12 is illustrated. In this condition, when the actuator unit 15 is mounted on the frame 13, as shown by FIG. 1, the screw hole 22 provided on the base boss 21 of the frame side is fit with the screw hole 18b of the actuator unit side, and the actuator unit 15 is provisionally fastened on the frame 13 by the screw 26 penetrated from the actuator unit front side. Then the screw hole 24 which is provided on the adjusting boss 23 adjustable for the perpendicular shaft 12 is fit with the screw hole 16a of the actuator unit 15 and the screw 27 is penetrated therethrough and jointed. Thereafter, the screw hole 29 provided on the attachment boss 12 of the mirror body side is fit with the screw hole 16c provided on the actuator unit 15 and the actuator unit 15 is secured on the frame 13 by penetrating the screw 30 therethrough.

As described above, the actuator unit is so positioned that a base axis of abscissas X thereof is set to be parallel with the ground plane of the automobile body.

Figure 6:
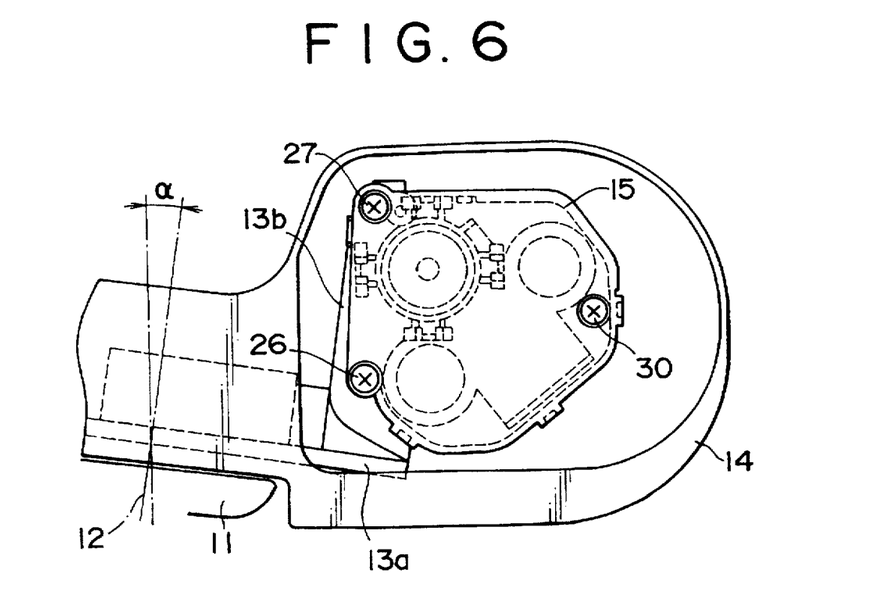
FIG. 6 is an elevation view of main parts showing an example of attaching the actuator unit in a condition of the shaft for rotating the mirror body being inclined.

As shown by FIG. 6, the shaft 12 is mounted and outwardly inclined in a certain angle from its perpendicular state and the frame 13 is pivotably supported on the shaft 12. In this condition, as shown by FIG. 6, the actuator unit 15 is so mounted on the frame 13 that a screw hole 22 provided on the base boss 21 and the screw hole 18b of the actuator unit side are fit with each other and are provisionally fastened by penetrating the screw 26 from the actuator unit front portion. The second screw hole 25 provided on the adjusting boss 23 and the screw hole 18a of the actuator unit 15 are fit with each other and are jointed by penetrating the screw 27. The inclination (levelness) of the actuator unit is adjusted centering around the provisionally fastened screw 26, thereafter the screw hole 29 provided on the attachment boss 28 of the mirror body side and the screw hole 18c provided on the actuator unit 15 are fit with each other, and the actuator unit 15 is secured on the frame 13 by penetrating a screw 30.

Figure 7:
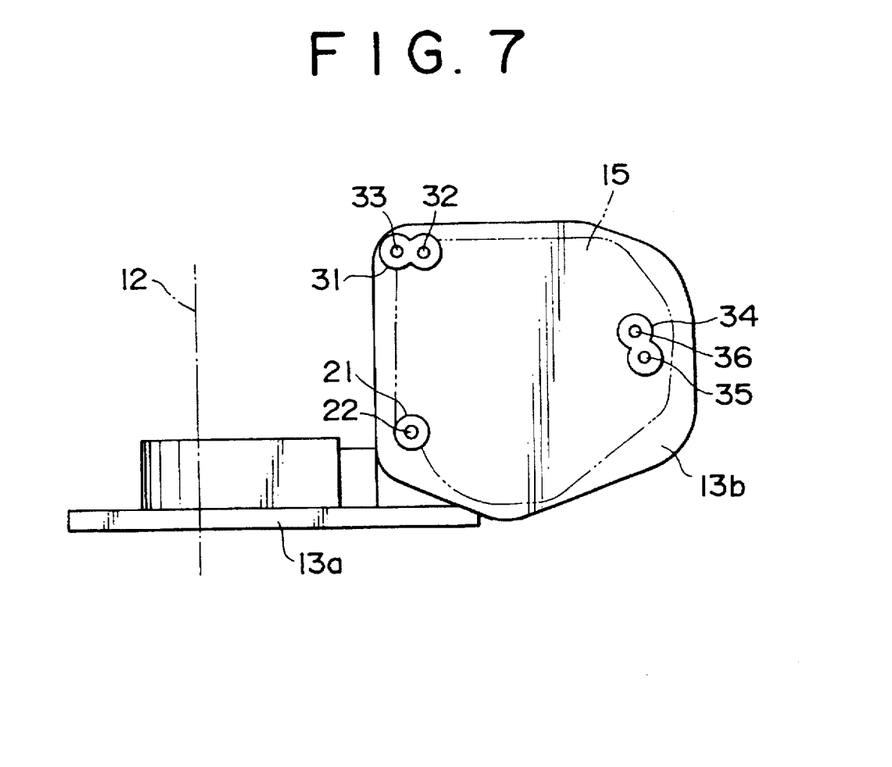
FIG. 7 is an explanation view of a modified example of the frame portion.

In FIG. 7, a modified example of the frame portion is illustrated that the support surface 13b stood toward the perpendicular direction from the root portion 13a is formed with a wide width. The positioning means 20 is mounted on the support surface 13b to hold the actuator unit 15 at a certain position and will be described hereinbelow.

The base boss 21 is protrudingly and integrally formed with a surface of the support surface 13b around the frame root portion 13a. The screw hole 22 is formed on an end surface of the base boss 21. A first adjusting boss 31 which has a same length of the base boss 21 and has a round end surface is protrudingly mounted on an upper surface of the base boss 21, and first and second screw holes 32, 33 are provided on the end surface of the adjusting boss 31. On a perspective upper portion of the base boss 21, a second adjusting boss 34 which has a same length of the base boss 21 and has a round end surface is provided. First and second screw holes 35, 36 are also provided on the end surface of the second adjusting boss 34. Corresponding to an inclination degree of the shaft, screw holes 32, 33 are provided with certain spaces on the same circumference centering around the screw hole 22 opened through the base boss. Further screw holes 35, 36 are also provided with certain spaces corresponding to an inclination of the shaft on the same circumference centering around the screw hole 22 opened on the base boss.

These screw holes 22, 32, 33, 35, 36 are set to correspond with any one of three screw holes formed on the periphery edge of the actuator unit 15 so as to receive screws 26, 27 and 30 through the front surface of the actuator unit 15.

For attaching the actuator unit 15 on the frame as described above, when the position of the mirror body rotating shaft 12 is set to be perpendicular to the ground plane of the automobile body and the frame 13 is pivotably supported on the shaft 12, at first the screw hole 22 provided on the base boss 21 of the frame side is fit with the screw hole 18b of the actuator unit side and thereafter those are provisionally fastened by penetrating the screw 26 from the actuator unit front side. Then the first screw hole 32 provided on the first adjusting boss 31 for a condition of the shaft 12 being perpendicular and the screw hole 18a of the actuator unit 15 are fit with each other and are joined by penetrating the screw 27. Same as described above, the first screw hole 34 provided on the second adjusting boss 34 for a condition of the shaft 12 being perpendicular and the screw hole 18c of the actuator unit 15 are fit with each other and are joined by penetrating the screw 30.

As described hereinbefore, the actuator unit is positioned so that the axis of abscissas X on where said unit is set is parallel with the ground plane of the automobile body.

When the shaft 12 is inclined with a certain angle outwardly from the perpendicular state thereof, the attachment of the actuator unit 15 on the frame 13 will be described. The screw hole 22 provided on the base boss 21 and the screw hole 18b of the actuator unit side are fit with each other and the screw 26 is provisionally fastened from the actuator unit front portion. Thereafter the second screw hole 33 provided on the adjustingboss 31 and the screw hole 18a of the actuator unit 15 are fit with each other and are jointed by penetrating the screw 27. The second screw hole 36 provided on the second adjusting boss 34 and the screw hole 18c of the actuator unit 15 are fit with each other and are joined by penetrating the screw 30. Centering around the provisionally fastened screw 26, the inclination (horizontal level) of the actuator unit is adjusted, and the screw hole 29 provided on the attachment boss 28 of the mirror body side and the screw hole 18c provided on the actuator unit 15 are fit with each other and the actuator unit 15 is fixed on the frame by penetrating the screw 30 (see FIG. 8).

Figure 8:
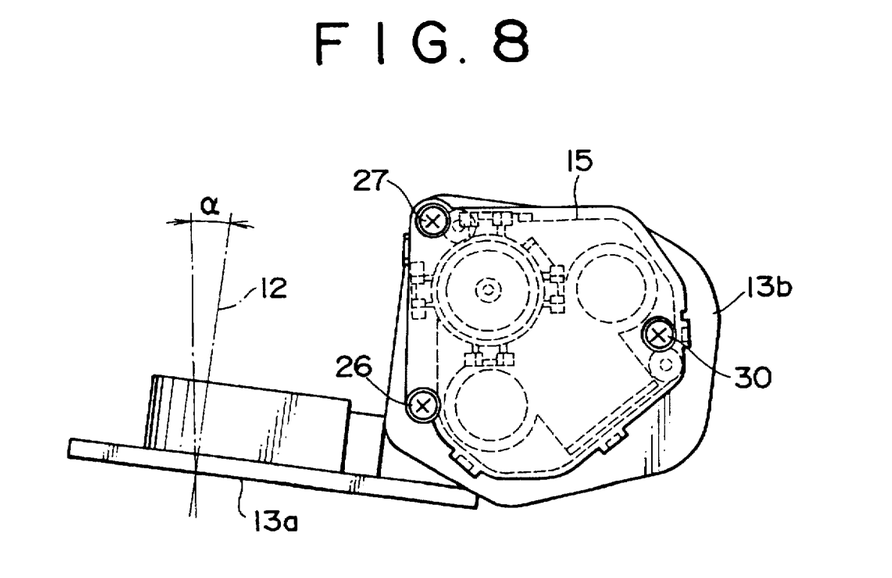
FIG. 8 is an elevation view of main parts showing an example that the actuator unit is mounted on the frame illustrated by FIG. 7 in a condition of the inclined shaft.
Figure 10:
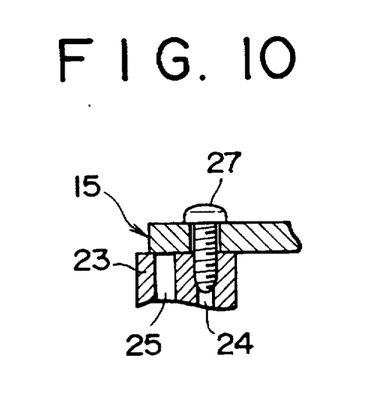
FIG. 10 is a cross section view showing an attachment of the actuator unit via the boss by a screw.

For example, as shown by FIG. 10, it is possible that the screw 27 to be penetrated from the actuator unit front portion to the frame so as to secure the actuator unit 15 is a tapping screw. In FIGS. 7 and 8, the mirror body is not shown.

Figure 9A:
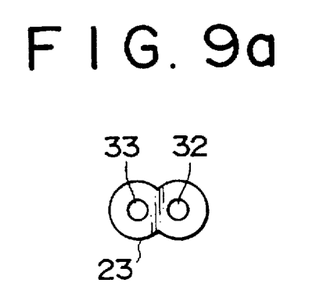
FIGS. 9a–9d are explanation views of a shape of the adjusting boss.
Figure 9B:
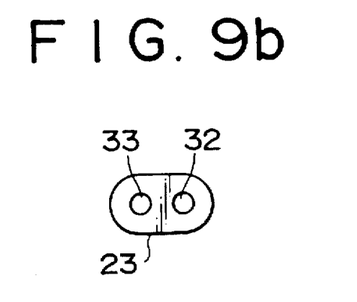
Figure 9C:
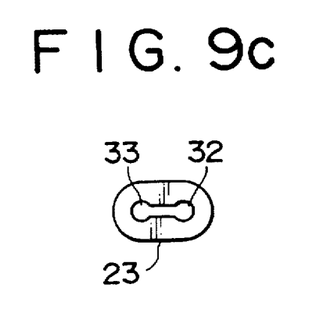
Figure 9D:
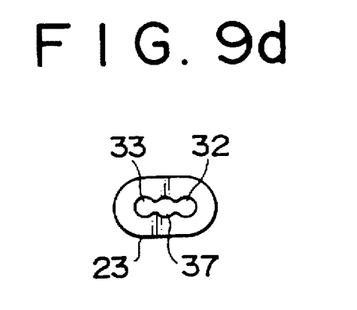

The form of the end surface of the adjusting boss 23, 31, 34 protrudingly mounted on the frame is not limited to the round surface having a neck and is possible to be oval, and said form is illustrated in FIG. 9 (b) to FIG. 9(d). As shown by FIG. 9(d), it is not limited to two adjusting boss holes, and three holes 32, 33, 37 will be possible. Further as illustrated by FIG. 9(c) or FIG. 9(d), it is also possible to provide the holes 32, 33 which are co-penetrated (communicate) with each other in appearance, and further it is possible to design it with a long hole shape. In the embodiment described hereinbefore, the boss is provided and the screw hole is formed thereon. However, it is possible to form a base screw hole and several adjusting screw holes directly on a support surface 13b for the actuator unit without providing a boss. As described above, it will be appreciated that changes and modifications may be made in our invention without departing from the spirit or essential characteristics thereof.

What is claimed is:

1. A levelness adjusting device for a foldable mirror having a mirror body, the device comprising a base; a shaft arranged on said base for erecting and foldably rotating the mirror body; a frame for fixing the mirror body and rotatably supported on said shaft, said frame having a front portion with a support surface; an actuator unit secured on said support surface and having a peripheral edge with a screw hole; a mirror holder; a mirror element tiltably mounted on a front side of said actuator unit via said mirror holder; and positioning means including a base boss provided on said support surface, a base screw hole provided on an end surface of said base boss to provide a support point, an adjusting boss provided at a position having a predetermined distance from said base boss on said front portion, several adjusting screw holes provided on the end surface of said adjusting boss to correspond to an inclination of said shaft at the time of assembling said mirror body, said adjusting screw holes are located on an arc of a circle centering of said base screw hole having a close distance each other, and several joint screws penetrating into screw holes formed on said peripheral edge of said actuator unit so as to penetrate into said base screw hole and selected one of said adjusting screw holes, respectively.

2. A levelness adjusting device as defined in claim 1, wherein said frame providing a front portion having a support surface which is wide and almost square in shape; said positioning means including a base boss protrudingly provided at a corner part nearby said shaft ons aid support surface, a base screw hole provided on an end surface of said base boss to provide a support point, a first adjusting boss provided at upper corner part of said base boss on said support surface, a second adjusting boss provided near outer end on said support surface, a first and a second adjusting screw holes provided on each end surface of said first and second adjusting bosses to correspond to an inclination of said shaft at the time of assembling said mirror body, said adjusting screw holes are located on an arc of a circle centering of said base screw hole having a close distance each other, and several joint screws penetrating into screw holes formed on said peripheral edge of said actuator unit so as to penetrate into said base screw hole and selected one of each said first or second adjusting screw holes, respectively.

* * * * *